May 1, 1962
D. M. MUSSON ET AL
3,032,217
APPARATUS FOR FACILITATING THE MOUNTING
OF AN AUTOMOBILE ON A TRUCK
Filed Aug. 20, 1958
5 Sheets-Sheet 1
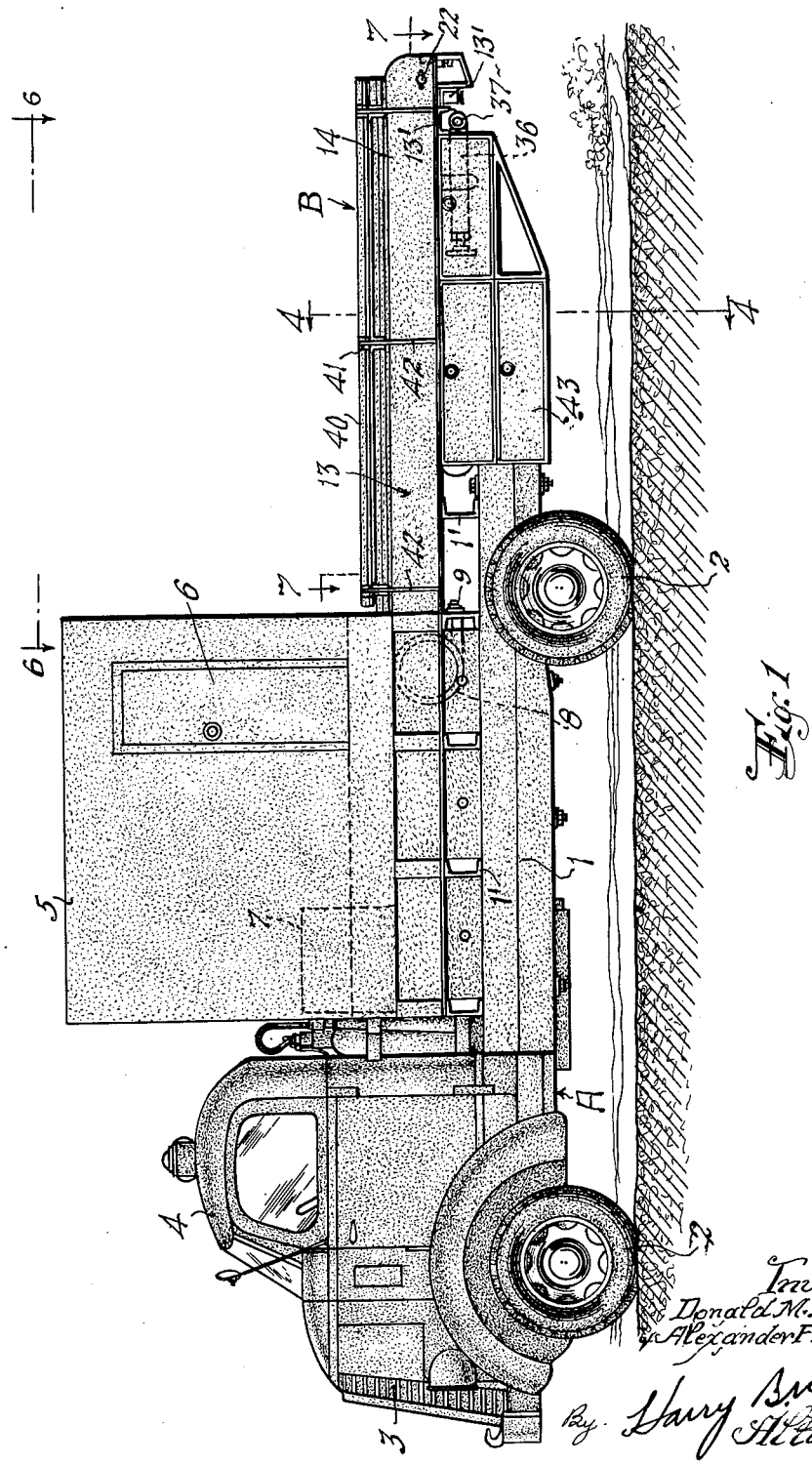

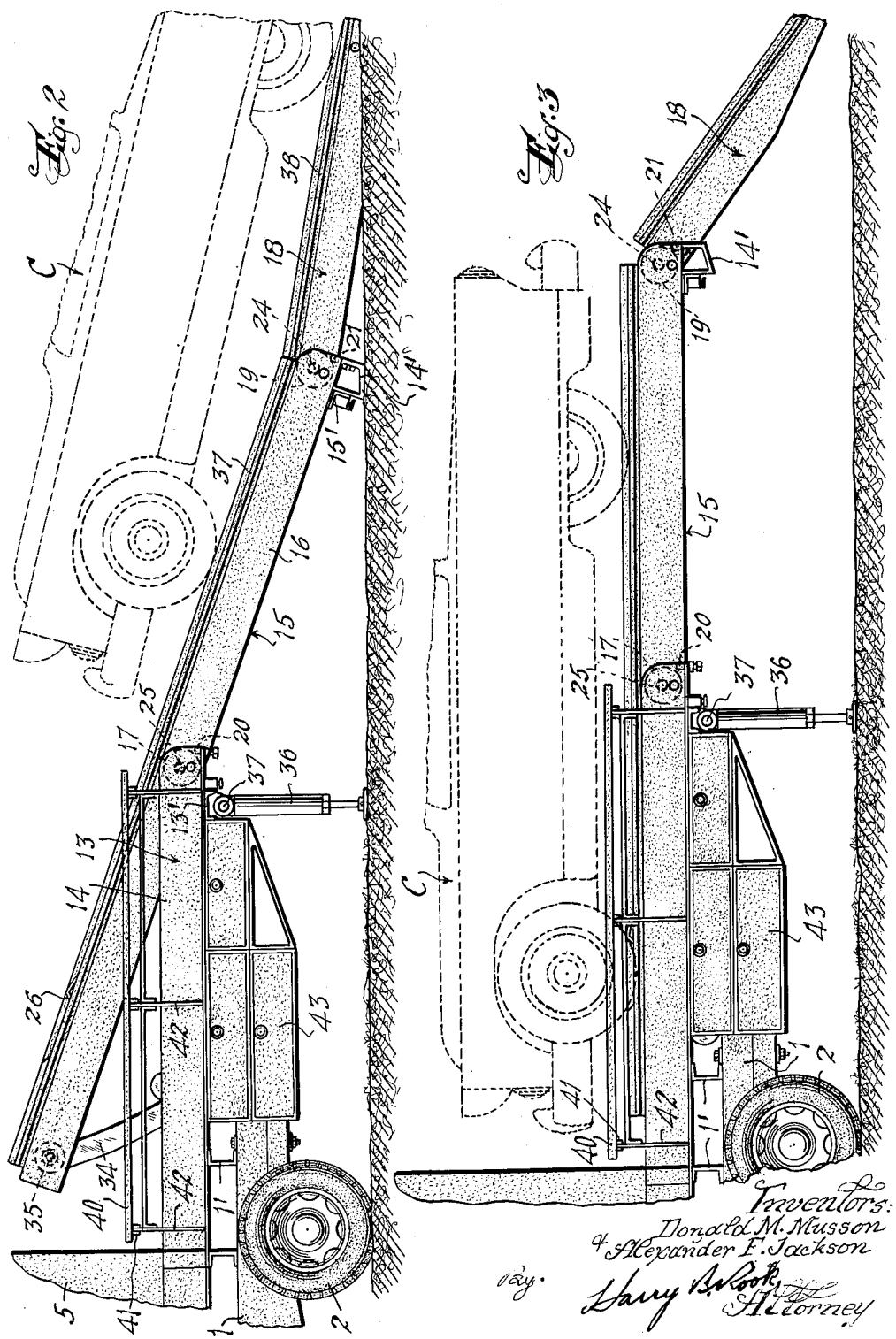

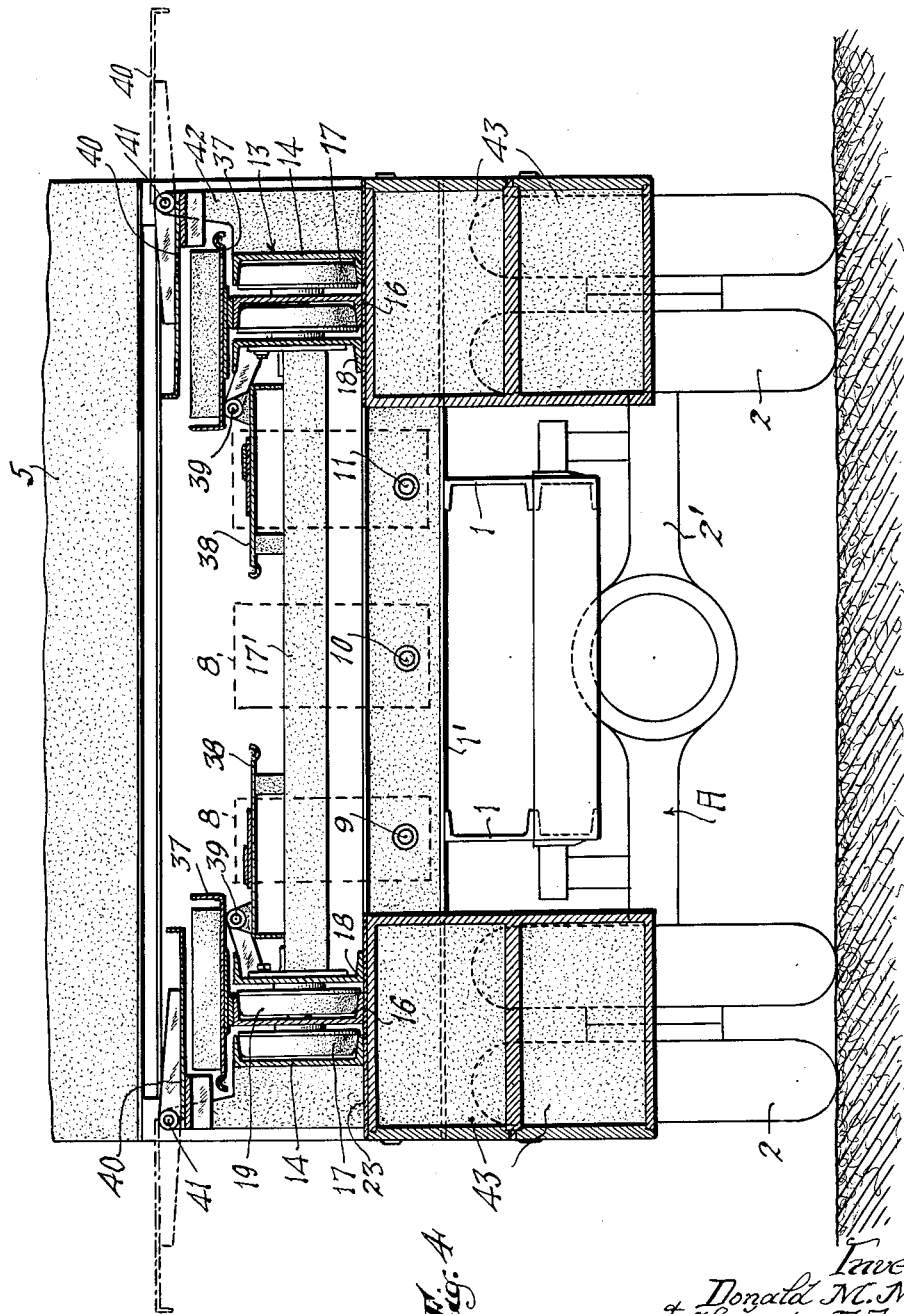

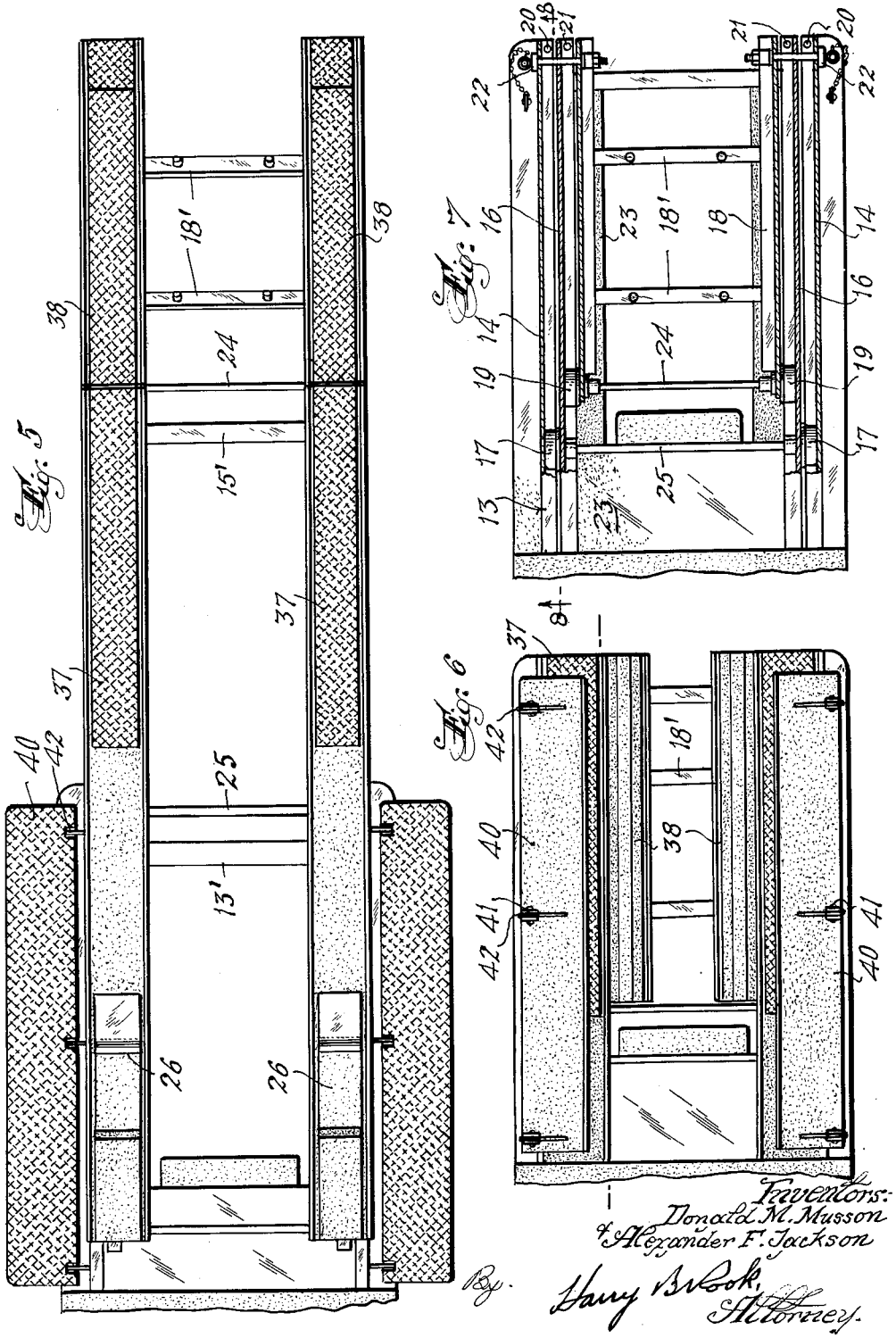

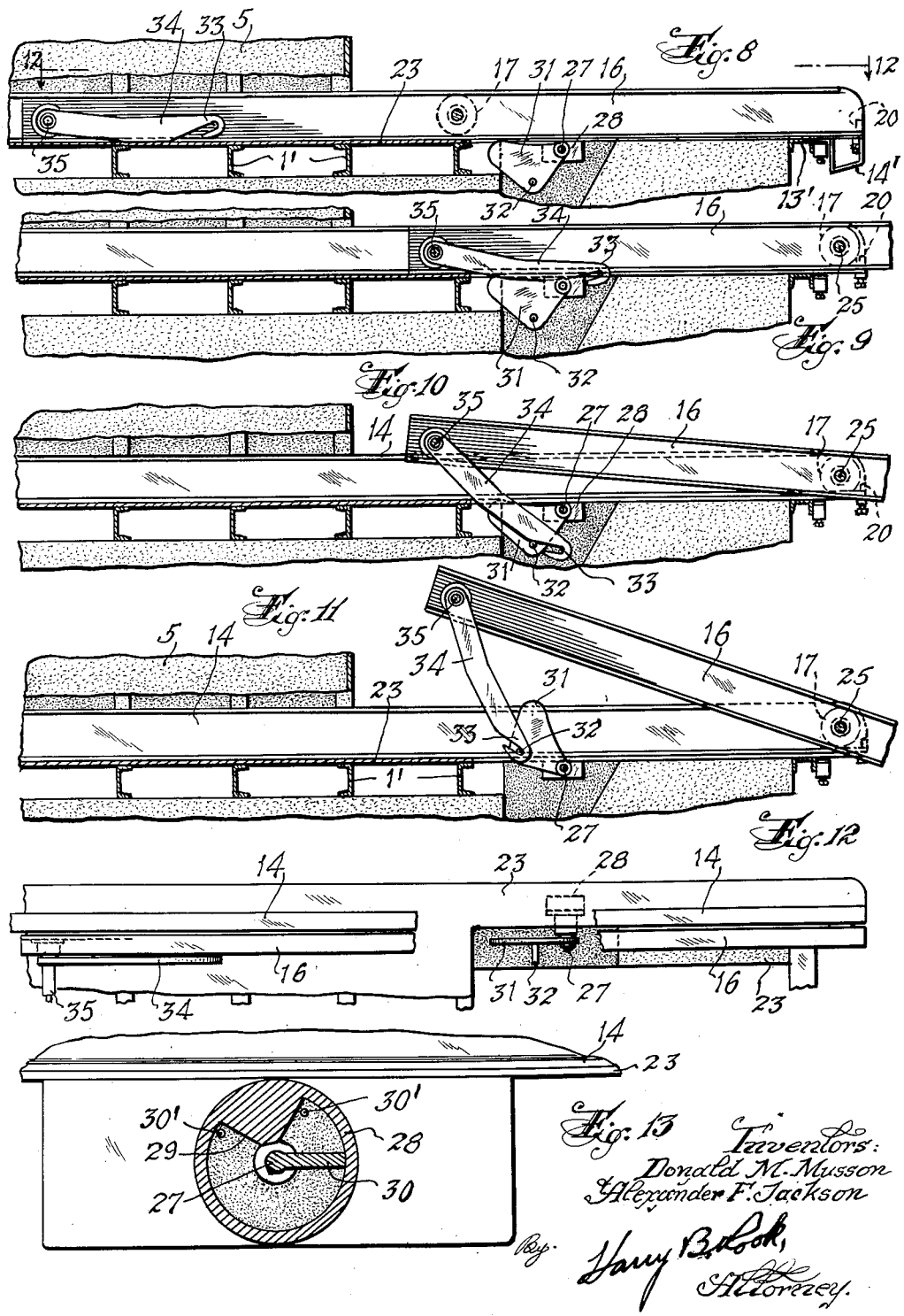

United States Patent Office 3,032,217
Patented May 1, 1962

3,032,217
APPARATUS FOR FACILITATING THE MOUNTING OF AN AUTOMOBILE ON A TRUCK
Donald M. Musson, 206 Harding Ave., North Plainfield, N.J., and Alexander F. Jackson, 495 Main St., Orange, N.J.; Rose D. Jackson and Barbara J. Allgeier, executrices of the estate of Alexander F. Jackson, deceased
Filed Aug. 20, 1958, Ser. No. 756,127
5 Claims. (Cl. 214—505)

This invention relates in particular to apparatus for servicing automobiles in the driveways of homes, factory yard and various other locations, so as to eliminate the necessity for driving the vehicle to be serviced to a service station. The invention especially contemplates means whereby an automobile to be serviced may be elevated so that an operator may easily inspect and work upon the underside of the automobile.

One object of the present invention is to provide a novel and improved apparatus, including a tiltable ramp whereby an automobile to be serviced may be elevated under its own power to a predetermined height that shall be no more and no less than the advantageous height required by a worker servicing the automobile and which may be permanently installed at a service station but preferably is mounted on a truck body for convenient movement from one location to another so that for example the truck and apparatus may be driven and used in driveways or in front of residences with a minimum danger of entanglement with overhead wires or tree branches.

Another object of the invention is to provide a novel and improved service truck which shall include a combination of means to provide for easy and quick elevation of an automobile for inspection and servicing upon the underside thereof and which shall also include lubricating apparatus, air pumps and other equipment that is required for lubricating an automobile, inflating the tires thereof and otherwise servicing the automobile.

A further object is to provide apparatus of this character that shall include a main support frame and a ramp comprising a section pivotally mounted intermediate its ends on said support frame on a horizontal axis so that the pivotally mounted ramp section may initially be inclined to the ground whereby an automobile may be driven from the ground upwardly on said ramp section and swing said ramp section into a horizontal position as the center of gravity of the automobile passes beyond the pivot point of said section, after which the automobile will be held in a horizontal elevated position for servicing and thereafter may be driven down the ramp to the ground level.

Still another object of the invention is to provide such a combination of a support frame and a ramp which shall include a plurality of pivotally connected or articulated ramp sections that may also be relatively slid into nested relation to each other and to the support frame when the ramp is not in use, one of said ramp sections being tiltably mounted on the support frame to provide an inclined ramp for movement of the automobile upwardly and downwardly and to provide a stable support for the automobile with the latter in elevated position.

Other objects, advantages and results of the invention will be brought out by the following description in conjunction with the accompanying drawings in which—

FIGURE 1 is a side elevation of a mobile automobile servicing apparatus or truck embodying the invention with the ramp sections in normal, collapsed or nested condition;

FIGURE 2 is a fragmentary side elevation of the support frame or rear end of the truck chassis and the ramp in position for elevating an automobile;

FIGURE 3 is a similar view showing the ramp in the position for holding the automobile elevated above the ground level;

FIGURE 4 is a greatly enlarged transverse vertical sectional view approximately on the plane 4—4 of FIGURE 1;

FIGURE 5 is a top plan view of the portion of the apparatus illustrated in FIGURE 2;

FIGURE 6 is a fragmentary top plan view of the apparatus from approximately the plane of the line 6—6 of FIGURE 1;

FIGURE 7 is a fragmentary horizontal sectional view approximately on the plane of the line 7—7 of FIGURE 1;

FIGURE 8 is a fragmentary vertical longitudinal sectional view approximately on the plane of the line 8—8 of FIGURE 7 with portions omitted for clearness in illustration, and showing the ramp sections in normal nested relation;

FIGURE 9 is a similar view showing the main ramp section moved to its outer limit;

FIGURE 10 is a similar view showing the main ramp section partially tilted;

FIGURE 11 is a similar view showing the main ramp section in its fully tilted position as shown in FIGURE 2;

FIGURE 12 is a fragmentary horizontal sectional view approximately on the plane of the line 12—12 of FIGURE 8; and FIGURE 13 is a schematic sectional view of a snubber to cushion the tilting of the main ramp section.

Specifically describing the illustrated embodiment of the invention, the reference character A designates a motor truck having a chassis 1 mounted on wheels 2 and driven by a suitable motor not shown but located at the forward part 3 of the driver's cab 4.

Mounted on the chassis, preferably near the cab, is a housing 5 for suitable servicing material and equipment such as tires, said housing having a door 6 for access. Also mounted in the housing or on the chassis elsewhere is an air pump mechanism 7, lubricants and fuel pumps 8 the outlets 9, 10 and 11 of which are arranged at the rear end of the chassis for convenience of the operator during the work upon the automobile being serviced while the latter is mounted on the means or apparatus B for elevating the automobile.

This means or apparatus is shown as comprising a support frame 13 that includes 2 channel-shaped side pieces 14 which are rigidly mounted on the chassis by any suitable means including cross pieces 1' that are rigidly secured to the chassis and to which the side pieces 14 are rigidly secured. The side pieces project rearwardly beyond the rear axile 2' of the truck a distance greater than one-half the length of the automobile to be elevated and are spaced a substantial distance above the ground to provide adequate space for movements of workmen beneath an elevated automobile, and said side pieces extend longitudinally of the chassis at opposite sides thereof with their channels facing each other as best shown in FIGURE 4. Within these side pieces is mounted the main ramp section 15 which includes two parallel side bars 16 of a length greater than the length of the automobile to be elevated and intermediate the ends of which are mounted rollers 17 which roll in the channels of the side pieces 14 of the support frame. Similarly mounted in the main ramp section 15 is a secondary ramp section 18 the inner end of which is mounted on rollers 19 which roll in the channels of the respective side bars 16 of the main ramp section. At the outer ends of the support frame pieces 14 are stop screws 20 to be abutted by the rollers 17 for limiting outward movement of the main section, and similar stop bosses 21 are provided at the outer ends of the side bars 16 of the main ramp section to be abutted by the rollers 19 for limiting outward movement of the secondary ramp section.

With this construction, the main ramp section may be rolled or slid inwardly of the support frame toward the truck cab 4 into its normal position shown in FIGURES 1, 6, 7 and 8, and the secondary ramp section may be slid or rolled into the main section as best shown in FIGURES 1, 6 and 7 so that the ramp sections and the support frame may be arranged in compact nesting relation to each other when the ramp is out of use.

Some suitable locking means such as removable pins 22 are insertable through registering openings in the side pieces 14 of the support frame and the side bars 16 and 18 of the ramp sections to hold the ramp sections against accidental displacement from their out-of-use positions. See FIGURES 1 and 7.

To provide further support for the ramp sections while they are in their nested position, a plate 23 may be mounted on the cross pieces 1' so that the lower edges of the ramp sections may rest thereon as best shown in FIGURE 8. It will be noted that when the main ramp section is in its innermost or normal position the inner end thereof extends beneath the housing 5 so as to economize in space.

When it is desired to elevate an automobile to be serviced the operator will first remove the locking pins 22 and pull the secondary ramp section outwardly or to the rear of the track until the rollers 19 engage the stop screws 21, whereupon he will continue pulling and the main section 15 will be thereby pulled outwardly until its rollers 17 strike the screws 20, whereupon the secondary section will be lowered to the ground and the main section will tilt as best shown in FIGURES 2 and 5. Desirably, tie bars 13' and 15' reinforce the outer ends of the bars 14 and the bars 16, respectively, and feet 14' provide for a stable support of the section 15 on the ground. It will be noted that the secondary section is povitally connected to the main section by the shaft 24 that connects the rollers 19, while the main section will tilt about the axis of the shaft 25 which connects the rollers 17.

Thereupon the automobile C to be serviced which is shown by dotted lines in FIGURE 2 is driven by its own power onto the ramp, using the low gear, and as the center of gravity of the automobile moves past the axis of the rollers 17, the main ramp section will tilt into a horizontal position as shown in FIGURE 3. The upward movement of the automobile will be continued until its front wheels drop into wheel rests 26 at the inner end of the main ramp section, whereby the automobile will be held against rolling backwardly on the ramp. It will be understood that the support frame B is sufficiently high to enable an operator to inspect and work upon the underside of an elevated automobile, and he may lubricate the automobile and inflate the tires by connecting appropriate hoses to the proper outlets 9, 10 and 11. After the servicing has been completed, the automobile will be driven backwardly down the ramp under its own power to the ground level, the sections of the ramp tilting from the positions shown in FIGURE 3 to the positions shown in FIGURE 2.

It is desirable to provide a snubber to retard the swinging movement of the main section 15 and any suitable means may be provided. As shown, a known type of hydraulic snubber is used and includes a vane 30 connected to a shaft 27 within a cylinder 28 so that upon rotation of the shaft and vane in the cylinder the liquid will be transferred to the opposite side of the vane and walls 29 in the cylinder through suitable passages such as indicated at 30'. The shaft 27 has connected thereto an operating arm 31 which has a pin 32 to be engaged by the hooked end 33 of snubbing arm 34 pivoted at 35 at the inner end of the side bars 16 of the main ramp section (FIGURES 8-12) when the ramp section is tilted in its outermost position as shown in FIGURE 11. One end of the arm 31 is abutted by and pressed downwardly by the side bars 16 of the main ramp section as the latter tilts toward its horizontal position as shown in FIGURES 8 and 9 and the hook 33 is disengaged from the pin 32 by engagement of the arm 31 with the plate 23, (FIG. 9). Thus the tilting movement of the main ramp section is snubbed in both directions.

It may be desirable in some instances to provide adjustable safety props 36 at the rear end of the support frame to prevent tilting of the support frame or truck body, and as shown these props may be pivotally connected at 37 to the support frame so that selectively they can be swung upwardly into out-of-the-way positions beneath the support frame as shown in FIGURE 1 or may be swung downwardly into vertical positions as shown in FIGURES 2 and 3. It will be observed that the side bars 16 of the main section have permanently secured thereto tread plates 37 for the vehicle wheels, but due to the nesting relations of the ramp sections and tread plates 38 for the secondary section must be pivotally connected at 39 to the side bars 18 of the secondary section so that they may swing inwardly as shown in FIGURES 4 and 6 when the secondary section is in nested position so as to clear the tread plates 37 of the main section. The cross pieces 17' of the secondary section limit the inward swinging of the tread plates as best shown in FIGURE 4. When the secondary section is pulled outwardly the tread plates 38 are swung upwardly and outwardly about the pivots 39 as shown in FIGURES 2 and 5.

It is also desirable to provide catwalks 40 so that the operator may conveniently walk alongside the elevated automobile and also have easy access to the door 6 of the housing 5. As shown, these catwalks are pivotally mounted at 41 on vertical brackets 42 secured to the outer sides of the side pieces 14 of the support frame. The catwalks are shown in their normal inoperative positions and in their operative positions by the respective solid lines and broken lines in FIGURE 4. The catwalks are shown in their operative positions in FIGURE 5 and in their normal inoperative positions in FIGURE 6.

From the foregoing, it will be seen that the invention provides an automobile elevating ramp including a support frame that is preferably mounted at the rear end of a motor truck body at the front portion of which are the motor and servicing equipment; and that the ramp also includes a plurality of ramp sections each having a runway or tread plate for automobile wheels, the sections being mounted for relative movement selectively into approximate longitudinal alignment with each other as shown in FIGURE 5 and into nested relation as shown in FIGURES 1, 4 and 6. It will also be seen that the sections are connected for pivotal movement and that the main section is mounted to tilt about a point intermediate its ends relatively to the support frame so that normally all of said ramp sections may be nested horizontally in said support frame, and when it is desired to elevate an automobile said ramp sections may be pulled outwardly of said support frame into approximately longitudinal alignment, with the main section tilting as shown in FIGURE 2 and at least a second section inclined from said tilting section to the ground, whereby an automobile may be driven under its own power up said ramp onto said tilting section and as it moves forward its center of gravity will pass the pivotal connection 25 of the tilting section and said tilting section will swing into horizontal position on said support frame as shown in FIGURE 3 and hold the automobile in elevated position. When the ramp is mounted on a motor truck as shown the weight of the automobile will add to the over-balance of the weight of the motor and servicing equipment on the truck and thereby aid in holding the automobile safely in an elevated position.

It will be understood that other equipment and compartments such as the drawers 43 may be provided on the truck for storage purposes, and that many modifications and changes can be made in the details of construction of the apparatus within the spirit and scope of the invention.

What we claim is:

1. Apparatus comprising a motor truck having a chassis mounted on running gear including a rear axle and wheels and a motor and servicing equipment at the front portion thereof, a ramp including stationary horizontal support frame on the rear part of said chassis having a portion including two side pieces horizontally spaced apart extending rearwardly beyond the rear axle a distance at least one-half the length of the automobile to be elevated and vertically spaced a substantial distance above the ground providing space for a workman servicing an automobile on the ramp, a plurality of ramp sections each having horizontally spaced runways for automobile wheels, said section being mounted for relative longitudinal movement selectively into approximate longitudinal alignment with each other and into nested relations, the main one of said sections being of a length greater than that of the automobile to be elevated and being mounted for longitudinal movement relatively to said support frame into a position in approximate alignment with and projecting from the outer end of said support frame and into nested relation thereto, selectively, said sections being also connected for relative pivotal movement so that normally all of said ramp sections may be nested horizontally in said support frame, and there being means mounting said one main section to tilt freely about a point intermediate its ends relative to said support frame at the outer rear end of the latter when said main section is pulled outwardly into its position projecting beyond the rear end of said support frame, and means on the support frame inwardly or forwardly of said tilting point to support said ramp sections in horizontal nested relation, so that when it is desired to elevate an automobile said ramp sections may be pulled outwardly of said support frame, with said main section tilted and at least a second section inclined from the outer rear end of said tilted section to the ground, whereby an automobile may be driven under its own power up said second section onto and up said tilted section and then said tilted section may swing into horizontal position on said support frame, said point of tilting being related to the length of the tilting section providing for swinging of the tilting section into horizontal position on the support frame when the center of gravity of the automobile passes said point of tilting of the tilting section as the automobile is driven up said tilting section, whereby the automobile is held in horizontal elevated position by the tilting section and the support frame.

2. Apparatus as defined in claim 1 wherein each of said parallel side pieces of the support frame has a longitudinal channel facing the channel of the other, said main ramp section includes two spaced parallel side bars each having a longitudinal channel facing the channel of the other side bar and there is at least one roller on each side bar running in the channel of one of said side pieces, said main ramp also including two spaced parallel side bars each having a channel facing the channel of the other and said second section having at least one roller running in the channel of one side bar of said main section, and with the addition of stop means for limiting rolling of said main ramp section outwardly of said support frame, and stop means for limiting rolling of said second section outwardly of the main section.

3. Apparatus as defined in claim 1 wherein said main ramp section is mounted to move on and between said side pieces and includes two side bars between and on which said second section is mounted to run, and wherein said runways of the main section are fixed on the respective side bars, and said runways on the second section are pivotally mounted to swing selectively into alignment with the runways on the main section or to swing inwardly and downwardly into out-of-the-way positions with respect to said runways of the main section.

4. Apparatus as defined in claim 1 wherein each of said side pieces of the support frame has a longitudinal channel facing the channel of the other, said main ramp section includes two spaced parallel side bars each have a longitudinal channel facing the channel of the other side bar and there is at least one roller on each side bar running in the channel of one of said side pieces, said main ramp also including two spaced parallel side bars each having a channel facing the channel of the other and said second section having at least one roller running in the channel of one side bar of said main section, stop elements on said side pieces of the support frame to be abutted by said rollers on the main section to limit outward movement of the main section, and stop elements on the side bars of the main sections to be abutted by the rollers on the second section to limit outward movement of said second section.

5. Apparatus as defined in claim 1, with the addition of means for snubbing the tilting action of said main ramp section in both directions including a part on said ramp section cooperative with a part on said support frame.

References Cited in the file of this patent

UNITED STATES PATENTS

| | | |
|---|---|---|
| 606,520 | Darrah | June 28, 1898 |
| 2,100,694 | Judd | Nov. 30, 1937 |
| 2,485,300 | Lisota | Oct. 18, 1949 |
| 2,588,001 | Holland | Mar. 4, 1952 |
| 2,666,501 | Abbe | Jan. 19, 1954 |
| 2,703,658 | Bazzell | Mar. 8, 1955 |
| 2,765,938 | Di Addezio | Oct. 9, 1956 |
| 2,849,130 | Van Der Velde | Aug. 26, 1958 |